Dec. 17, 1957   D. S. SWARTHOUT   2,816,602
TIRE TREAD COMPRESSING TOOL
Filed Dec. 22, 1954   2 Sheets-Sheet 1
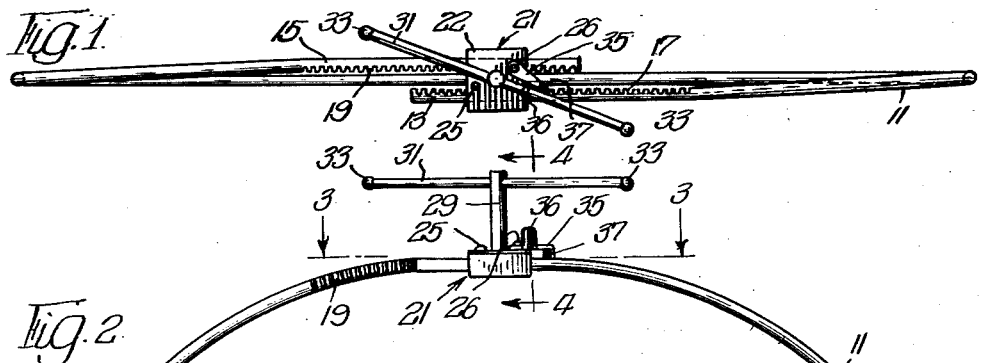
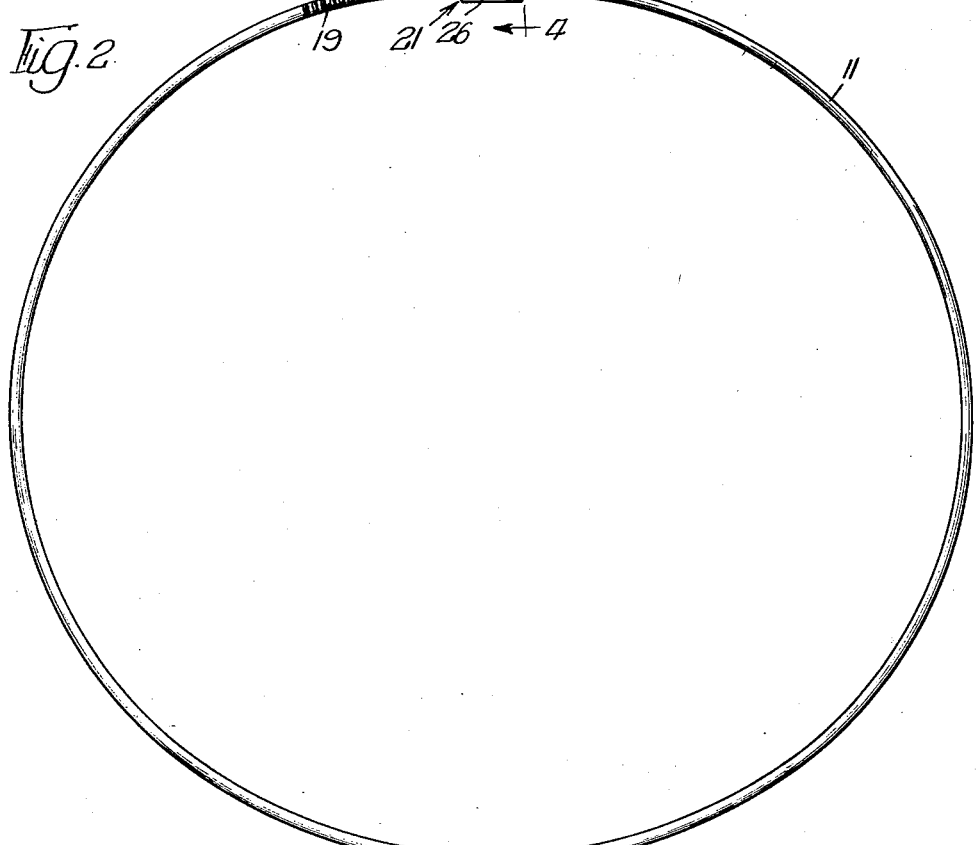
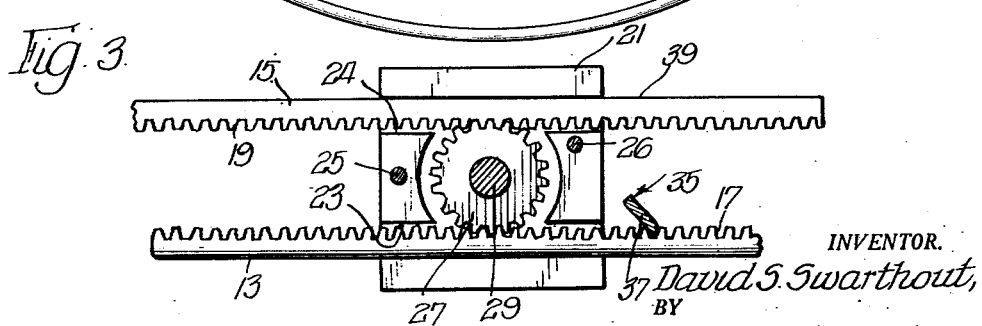
INVENTOR.
David S. Swarthout

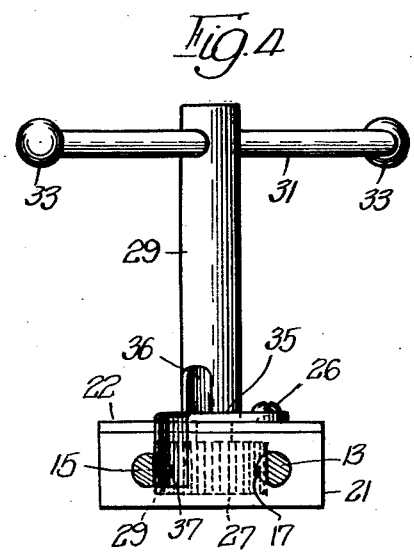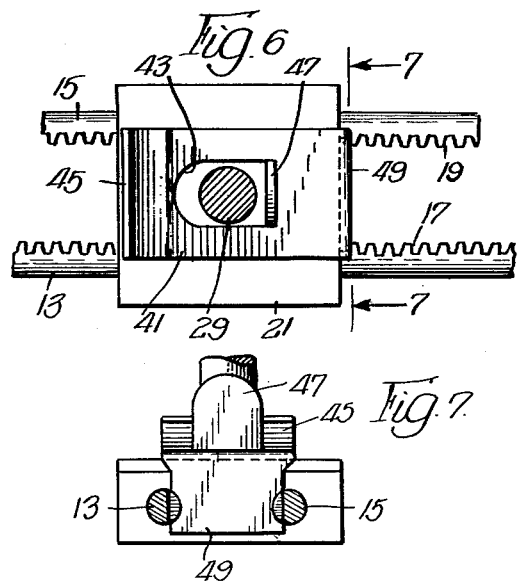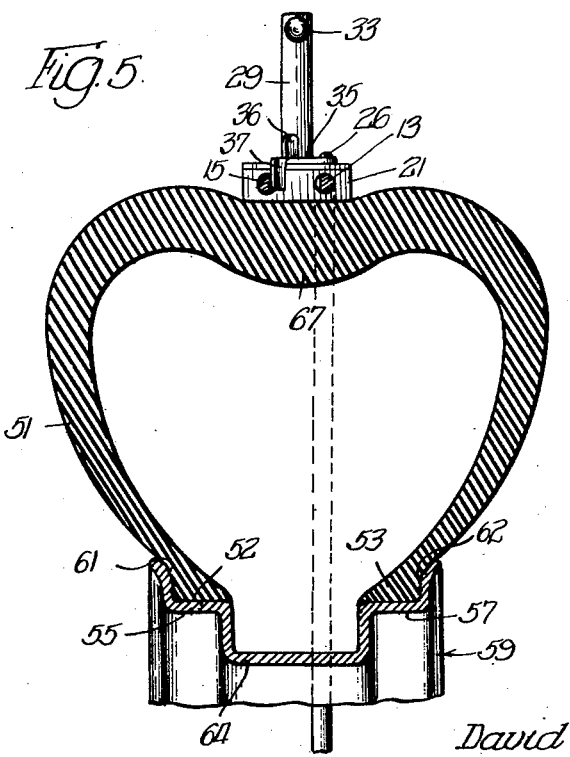

United States Patent Office 2,816,602
Patented Dec. 17, 1957

2,816,602

TIRE TREAD COMPRESSING TOOL

David S. Swarthout, Chicago, Ill.

Application December 22, 1954, Serial No. 476,906

1 Claim. (Cl. 157—1.21)

This invention relates to a new and improved tire tool and more particularly to a tool especially adapted for use with tubeless tires.

Tubeless tires are now in wide use and in contradistinction to the older tubeless tires which were complete tubes, the present tires comprise spaced beads and the rim between the beads serves to retain air in the tire. With such tires it is essential that the beads make and maintain airtight contact with the adjacent rim surfaces. For this purpose the beads are normally provided on their outer, generally vertical surfaces with circumferentially extending ridges of soft rubber or the like which are compressed against the inner lateral faces of the rim sides when the tire is inflated. These ridges must be held against the rim surfaces with substantial pressure before they provide an airtight seal.

It will be understood that the air inlet valve normally extends through the lower portion of the drop-center rims which are provided for mounting the tires. It is not possible to merely place the tire on the rim and start inflation as the tire does not make airtight contact with the rim. It is necessary therefore to provide mechanical means for forcing the tire beads outwardly against the rims with sufficient pressure to form an airtight seal before inflation can be begun. Once the internal air pressure has reached an amount adequate to force the bead ridge against the rim with sealing pressure, the mechanical means may be removed and the inflation can then continue until the desired working pressure is attained. It has been found with present types of tubeless tires that an internal pressure of approximately eight pounds per square inch is adequate to insure effective airtight sealing between the bead ridges and the rim.

It is an object of the present invention to provide a tire tool adapted to force the beads of tubeless tires with sealing pressure against rim side walls.

It is a further object to provide a tool of this character which operates by circumferential pressure on the outer face of the central tread portion of a tire sufficient to compress this portion of the tire inwardly in a radial direction.

It is also an object to provide a means to control such radial compression in order to force the tire beads and their sealing ridges in opposite axial directions so as to cause a sealing contact with inner rim faces.

It is an additional object to provide a tire tool of this character which is simple in design and operation and adapted for commercial production and use.

Other and further objects will appear as the description proceeds.

I have shown certain preferred embodiments of my invention in the accompanying drawings in which—

Figure 1 is a plan view of the device;

Figure 2 is a side elevation of the device;

Figure 3 is a view, partly in section, on line 3—3 of Figure 2 on an enlarged scale;

Figure 4 is a section on line 4—4 of Figure 2 on an enlarged scale;

Figure 5 is a cross section of a tire and rim with the device applied thereto;

Figure 6 is a plan view, on an enlarged scale, of the tightening means, showing a modified form of latch; and Figure 7 is a section taken on line 7—7 of Figure 6.

The device comprises the generally circular band 11 having the overlapping ends 13 and 15 as best shown in Figure 1. These overlapping ends are provided on their adjacent faces with teeth to form the racks 17 and 19. These ends pass through the housing 21 which has the passages 23 and 24 therein to receive the ends 13 and 15, respectively. The upper face of the housing is closed by cover plate 22 held in place by the machine screws 25 and 26. The tightening gear 27 is carried in the housing 21 and meshes with the two racks 17 and 19. This gear is carried on the shaft 29 which is jounalled in the housing 21. As shown in Figures 1 and 2, the shaft 29 extends upwardly and carries the operating handle 31 having the ball ends 33. This handle 31 is preferably slidingly fitted in an opening in the shaft 29 so that it may be extended in either direction for purposes of increasing the leverage applied to the shaft 29 and gear 27.

In order to lock the lock or latch the ends of the band in the desired position, a latch member 35 is provided pivoted about the screw 26. The latch member 35 has formed thereon the upwardly extending finger piece 36 and the downwardly extending latching lug 37 adapted to be swung to engage between teeth of the rack 17 on the end 13. This member 35 is shown in elevation in Figure 4.

An alternate form of latch is shown in Figures 6 and 7, this latch comprises the body member 41 having an opening 43 so that the member fits on top of the housing 21, the shaft 29 passing upwardly through the opening 43. The body member 41 is provided with an upturned rear flange 45 and the metal from the opening 43 is bent upwardly to form an ear 47 adjacent the shaft 29. As shown in Figure 6, the right end of the body member 41 is bent downwardly at 49 to form a latch piece of such width as to fit between the rack teeth 17 and 19 on the opposed ends 13 and 15 of the band. It will be apparent that this latch is lifted out of contact with the racks while the band is tightened and is brought down in position when the band has been reduced to its desired circumference. This may be accomplished by lifting and turning the latch so that the latch piece 49 extends down opposite either side of the housing 21 during the tightening. The band may be readily released by lifting the latch by means of one or both of the upturned portions 45 and 47.

The device has been shown in use in Figure 5, the tire 51 having beads 52 and 53 is shown in cross section seated on the lateral portions 55 and 57 of the rim 59. This tire is of the tubeless type and is provided with soft sealing ridges 61 and 62 which extends circumferentially on the outer vertical faces of the beads 52 and 53. The tire is installed on the rim 59 which is unitary by forcing the beads 52 and 53 together into the drop-center portion 64 of the rim on one portion so that the beads at the opposite side of the tire can be slipped up over the upper edge of the rim. It is now necessary to properly fit the beads on the portions 55 and 57 of the rim which can be readily accomplished due to the natural resilience of the tire and the tendency of the beads to spread apart.

This tendency of the beads to spring apart is not sufficient, however, to bring the circumferential ridges 61 and 62 into airtight sealing engagement with the rim walls. Since there is no inner tube and the air valve (not shown) extends through the drop-center portion of the rim, the tire cannot be inflated until the beads make airtight engagement with the rim.

The purpose of the present tool is to force the beads into such airtight engagement with the rim so that the tire can be inflated. The band 11 is extended to the proper size to fit over the tire being inflated, by suitable rotation of the shaft 29 and gear 27. It is slipped over the tire so that it extends around the center of the tread portion 67, as shown in Figure 5. The band is then contracted by manual rotation of shaft 29 and gear 27 by means of the sliding cross handle 31. When the center of the tread is compressed and forced inwardly, as shown in Figure 5, this causes the beads 52 and 53 to be pressed outwardly sufficiently so that their sealing ridges 61 and 62 make airtight contact with the inner faces of the adjacent rim portion. The band is next latched in compressed condition by either form of latch shown. The tire can now be inflated through the usual valve. It has been found in practice that after an air pressure of approximately eight pounds per square inch has been introduced into the tire, this air pressure itself will be sufficient to maintain the tire beads in sealing engagement with the rim. Therefore, after approximately this amount of air pressure has been introduced into the tire, the latch may be released and the tool expanded and removed from the tire. The inflation of the tire may then be completed.

The forms of construction are to be understood to be illustrative only. It will be apparent that various modifications of the construction and of the latch may be made to meet differing conditions and requirements and I contemplate such variations as come within the spirit and scope of the appended claim.

I claim:

A tire tread compressing tool comprising a flexible split ring having overlapped ends, gear racks formed on opposed faces of the ring end portions, ring tightening means including a housing, said housing having openings therein to receive the overlapped ring ends, a gear in said housing engaging the gear racks on said overlapped ring ends, means for manually rotating said gear, and a manually operable latch adapted to engage the gear racks to maintain the ring in adjusted position, said latch being provided with a latch piece fitted between the racks in latched position and engaging both racks.

References Cited in the file of this patent

UNITED STATES PATENTS

| | | |
|---|---|---|
| 605,848 | Borst | June 21, 1898 |
| 1,204,165 | Legg | Nov. 7, 1916 |
| 1,329,849 | Pierson | Feb. 3, 1920 |
| 1,475,065 | Gilbertson | Nov. 20, 1923 |
| 1,966,580 | Bull | July 17, 1934 |
| 2,205,741 | Bowers | June 25, 1940 |
| 2,684,112 | Coats | July 20, 1954 |